(12) United States Patent
Tanaka

(10) Patent No.: US 10,220,871 B2
(45) Date of Patent: Mar. 5, 2019

(54) STEERING DEVICE

(71) Applicant: JTEKT CORPORATION, Osaka-shi, Osaka (JP)

(72) Inventor: Eiji Tanaka, Kitakatsuragi-gun (JP)

(73) Assignee: JTEKT CORPORATION, Osaka (JP)

( * ) Notice: Subject to any disclaimer, the term of this patent is extended or adjusted under 35 U.S.C. 154(b) by 42 days.

(21) Appl. No.: 14/905,064

(22) PCT Filed: Aug. 20, 2014

(86) PCT No.: PCT/JP2014/071793
§ 371 (c)(1),
(2) Date: Jan. 14, 2016

(87) PCT Pub. No.: WO2015/025895
PCT Pub. Date: Feb. 26, 2015

(65) Prior Publication Data
US 2016/0167696 A1   Jun. 16, 2016

(30) Foreign Application Priority Data

Aug. 21, 2013  (JP) ................. 2013-171377
Oct. 10, 2013  (JP) ................. 2013-213004

(51) Int. Cl.
*B62D 1/19*   (2006.01)
(52) U.S. Cl.
CPC .................... *B62D 1/195* (2013.01)
(58) Field of Classification Search
CPC ............ B62D 1/195; B62D 1/19; B62D 1/18
USPC ....................................... 280/777
See application file for complete search history.

(56) References Cited

U.S. PATENT DOCUMENTS

| 4,643,028 | A | 2/1987 | Kondo et al. |
| 4,786,076 | A | 11/1988 | Wierschem |
| 4,943,028 | A | 7/1990 | Hoffmann et al. |
| 2009/0241721 | A1 | 10/2009 | Inoue et al. |
| 2012/0187669 | A1 | 7/2012 | Minamigata et al. |
| 2012/0267884 | A1 | 10/2012 | Fujiwara et al. |

(Continued)

FOREIGN PATENT DOCUMENTS

| CN | 101544243 A | 9/2009 |
| CN | 102030029 A | 4/2011 |

(Continued)

OTHER PUBLICATIONS

Jul. 25, 2016 Extended Search Report issued in European Patent Application No. 14838413.4.

(Continued)

*Primary Examiner* — Keith J Frisby
(74) *Attorney, Agent, or Firm* — Oliff PLC

(57) ABSTRACT

There is provided a steering device having a configuration in which a movable bracket can move relatively to a fixed bracket along with a steering member toward the downstream side in a movement direction, at the time of the second collision. A sliding member that is assembled to the movable bracket includes a main body section and a bent section. The main body section is provided, in the movement direction, over an entire length of a top surface of the movable bracket, which faces the fixed bracket, is inserted between the top surface and the fixed bracket, and rubs against the fixed bracket at the time of the second collision. The bent portion is latched to the movable bracket from the downstream side in the movement direction.

17 Claims, 10 Drawing Sheets

(56) References Cited

U.S. PATENT DOCUMENTS

| | | |
|---|---|---|
| 2013/0133460 A1 | 5/2013 | Uesaka |
| 2014/0197293 A1 | 7/2014 | Fujiwara et al. |
| 2016/0114828 A1 | 4/2016 | Tanaka et al. |
| 2016/0185380 A1 | 6/2016 | Fujiwara |

FOREIGN PATENT DOCUMENTS

| | | |
|---|---|---|
| CN | 102656078 A | 9/2012 |
| CN | 102858616 A | 1/2013 |
| CN | 103025597 A | 4/2013 |
| CN | 103129598 A | 6/2013 |
| EP | 0 295 378 A2 | 12/1988 |
| EP | 2700560 A1 | 2/2014 |
| EP | 3 015 341 A1 | 5/2016 |
| JP | S64-18775 A | 1/1989 |
| JP | 2012-121538 A | 6/2012 |
| JP | 2012-131302 A | 7/2012 |
| JP | 2012-236471 A | 12/2012 |

OTHER PUBLICATIONS

Nov. 11, 2014 International Search Report issued in International Patent Application No. PCT/JP2014/071793.

Dec. 5, 2016 Office Action issued in Chinese Patent Application No. 201480044344.0.

STEERING DEVICE

TECHNICAL FIELD

The present invention relates to a steering device.

BACKGROUND ART

When a vehicle collides with an obstacle such as another vehicle, following an occurrence of a first collision at that time, a second collision between a driver and a steering wheel (steering member) occurs in some cases. For the steering device, in order to absorb impact energy due to the second collision, various types of structures, in which a part of the steering column is disconnected from a vehicle body to move in a column shaft direction (vehicle body front direction), have been proposed.

For example, PTL 1 discloses a steering column supporting device in which a locking notch extending parallel to a column axis direction is provided in a vehicle body-side bracket fixed to the vehicle body. A locking capsule is fitted into the locking notch such that the locking capsule is positioned with respect to the vehicle body-side bracket using a plurality of locking pins. Also, a column-side bracket which holds the steering wheel is connected to the locking capsule using a bolt.

At the time of the second collision, the plurality of locking pins are fractured such that the locking capsule is released from the vehicle body-side bracket, and moves along with the column-side bracket along the locking notch thereof. In this manner, energy absorption (EA) is achieved at the time of the second collision.

CITATION LIST

Patent Literature

[PTL 1] JP-A-2012-121538

SUMMARY OF INVENTION

Technical Problem

In the steering column supporting device disclosed in PTL 1, the locking capsule rubs against a peripheral edge of the locking notch in the vehicle body-side bracket, at the time of the second collision. In order to smoothly absorb the impact energy due to the second collision, it is conceivable to use a configuration in which friction between the locking capsule and the peripheral edge is reduced; however, it is preferable that the configuration can be easily attached to the steering column supporting device. In addition, in the case of using the configuration, if the energy-absorbing load (also referred to as an EA load, that is, an impact load due to the second collision, which is absorbed through movement of the locking capsule) at the time of the second collision can be stabilized, which is preferable in that the energy absorption at the time of the second collision is promoted.

The invention is made in the view of these circumstances, and an object of the invention is to provide a steering device in which it is possible to achieve compatibility of both improvement of an assembly of a configuration, in which friction between a pair of relatively moving members is reduced such that impact energy due to the second collision is absorbed, and stabilization of energy-absorbing load at the time of the second collision in a case of using the configuration.

Solution to Problem

According to an advantageous aspect of the present invention, there is provided a steering device (1) including:

a fixed bracket (23) fixed to a vehicle body (13);

a movable bracket (24), having a facing surface (32A) which faces the fixed bracket, connected to a steering member (2), and configured to move relatively to the fixed bracket along with the steering member toward the downstream side in a predetermined movement direction (Z1) at a time of a second collision; and a sliding member (89), assembled to the movable bracket, and configured to move integrally with the movable bracket in a state of being interposed between the facing surface and the fixed bracket at the time of the second collision, and the sliding member includes a main body section (90), provided over an entire area of the facing surface in the movement direction, inserted between the facing surface and the fixed bracket, and configured to rub against the fixed bracket at the time of the second collision, and an attaching section (91) bent from a downstream-side end portion (90A) of the main body section in the movement direction, and latched to the movable bracket from the downstream side in the movement direction.

The movable bracket may include a plate-like section (32) that has the facing surface and a pair of curved sections (41) which are curved in the same direction from both sides of the plate-like section in an orthogonal direction (Y1) to the movement direction. The maximum dimension (M) of the main body section in the orthogonal direction may be greater than the maximum distance (N) between the pair of curved sections.

The attaching section may include a holding portion (95) which is formed by bending a distal end portion of the attaching section on a side opposite to the main body section side toward the upstream side in the movement direction, and which is disposed between the pair of curved sections so as to hold the plate-like section between the main body section and the holding portion.

A distance (K) from one edge (95A) to the other edge (95B) of the holding portion in the orthogonal direction may be equal to the distance (L) of the pair of curved sections on boundaries between the pair of curved sections and the plate-like section.

A convex portion (100) may be provided on one of the sliding member and the movable bracket. A concave portion (101), in which the convex portion is fitted, may be provided on the other of the sliding member and the movable bracket.

A suspending member (25) that extends from the fixed bracket and suspends the movable bracket may be provided. A cutout portion (93), through which the suspending member passes, may be formed in the sliding member.

A conductive friction-reducing material (200) may be provided on a portion of the sliding member, which rubs against the fixed bracket.

Further, numbers or the like in parentheses in the above description represent reference signs of corresponding components in the following embodiments; however, these reference signs are not used to limit the claims.

Advantageous Effects of Invention

According to the present invention, in the steering device, the movable bracket moves relatively to the fixed bracket toward the downstream side in the movement direction at the time of the second collision, and thereby it is possible to absorb impact energy at the time of the second collision.

Here, since the sliding member assembled to the movable bracket moves integrally with the movable bracket in a state of being interposed between the facing surface of the movable bracket and the fixed bracket, it is possible to reduce the friction between the movable bracket and the fixed bracket.

Such a sliding member includes the main body section which is inserted between the facing surface of the movable bracket and the fixed bracket and an attaching section bent from the downstream-side end portion of the main body section in the movement direction.

The main body section is provided over the entire length of the facing surface of the movable bracket in the movement direction. In this manner, the distance between the facing surface of the movable bracket and the fixed bracket is maintained in a state of being constant over the entire length in the movement direction. Hence, since the movable bracket can be stable and can move relatively to the fixed bracket at the time of the second collision, without a rapid change of its orientation in a state in which the distance is invariably constant, it is possible to achieve stabilization of the energy absorbing load at the time of the second collision.

The attaching section is latched to the movable bracket from the downstream side in the movement direction. Accordingly, it is possible not only to position the sliding member with respect to the movable bracket in the movement direction, but also to reliably force the sliding member to move integrally with the movable bracket toward the downstream side in the movement direction at the time of the second collision. Also, the main body section is only mounted on the facing surface of the movable bracket such that the attaching section is latched to the movable bracket, and thereby it is possible to easily assemble the sliding member to the movable bracket. Hence, it is possible to achieve improvement of an assembly of the sliding member.

As above, in the steering device, it is possible to achieve compatibility of both improvement of an assembly of a configuration (sliding member), in which friction between a pair of relatively moving members (between the movable bracket and the fixed bracket) is reduced such that impact energy due to the second collision is absorbed, and stabilization of energy-absorbing load at the time of the second collision in the case of using the configuration.

According to the present invention, since the maximum dimension of the main body section in the orthogonal direction is greater than the maximum distance between the pair of curved sections of the movable bracket, it is not possible for the sliding member to be physically embedded between the pair of curved sections by mistake. Accordingly, it is possible to correctly assemble the sliding member to the movable bracket such that the main body section is mounted on the facing surface of the plate-like section of the movable bracket. Hence, it is possible to achieve the improvement of the assembly of the sliding member.

According to the present invention, the plate-like section of the movable bracket is interposed between the holding portion formed on the distal end portion of the attaching section and the main body section, and thereby it is possible to reliably latch the attaching section to the movable bracket.

According to the present invention, the distance (distance between the outer-side edges of a pair of the holding portions positioned on both ends in the orthogonal direction, in a case where the plurality of holding portions are arranged in the orthogonal direction) between one edge and the other edge of the holding portion in the orthogonal direction is equal to the distance between the pair of curved sections at boundaries between the pair of curved sections and the plate-like section. Accordingly, if the holding portions are arranged between the pair of curved sections in the movable bracket, it is possible to position the sliding member in the orthogonal direction with respect to the movable bracket, and then there is no need for minute adjustment (of a position in the orthogonal direction) of the sliding member. Hence, it is possible to achieve improvement of the assembly of the sliding member.

According to the present invention, the convex portion is fitted to the concave portion, and thereby it is possible to position the sliding member and the movable bracket with respect to each other.

According to the present invention, the suspending member passes through the cutout portion of the sliding member, and thereby it is possible to assemble the sliding member to the movable bracket without interfering with the suspending member.

According to the present invention, the sliding member, in which the conductive friction-reducing material is provided, enables electrical conductivity between the fixed bracket and the movable bracket to be secured and enables smooth movement of the movable bracket relatively to the fixed bracket to be achieved at the time of the second collision.

DESCRIPTION OF EMBODIMENTS

Hereinafter, embodiments of the present invention will be described in detail with reference to the accompanying drawings.

Figure 1:
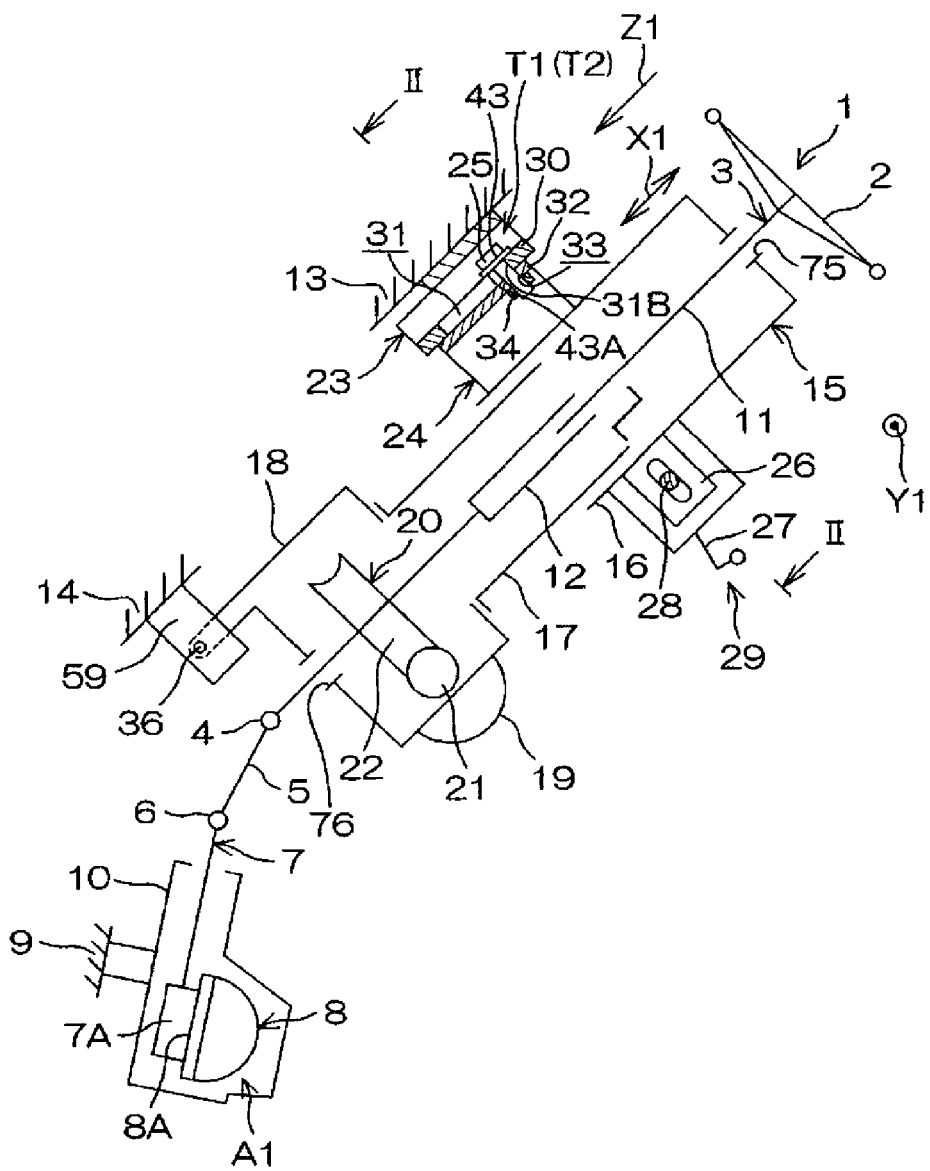
FIG. 1 is a schematic side view of a steering device 1 according to an embodiment of the present invention and schematically shows a configuration of the steering device 1.

FIG. 1 is a schematic side view of a steering device 1 according to an embodiment of the present invention and schematically shows a configuration of the steering device 1. Further, the left side in FIG. 1 means the front side of the steering device 1 and the vehicle body (to which the steering device 1 is attached) and the right side in FIG. 1 means the rear side of the steering device 1 and the vehicle body. In addition, the upper side in FIG. 1 means the upper side of the steering device 1 and the vehicle body and the lower side in FIG. 1 means the lower side of the steering device 1 and the vehicle body.

With reference to FIG. 1, the steering device 1 mainly includes a steering shaft 3 which is connected to a steering member 2 such as a steering wheel and extends in the front-rear direction, an intermediate shaft 5 connected to the steering shaft 3 through a universal joint 4, a pinion shaft 7 connected to the intermediate shaft 5 through a universal joint 6, a rack shaft 8, and a steering column 15.

A pinion 7A is provided in the vicinity of an end portion (lower end portion) of the pinion shaft 7 and meshes with a rack 8A of the rack shaft 8. A steering mechanism A1 is configured of a rack and pinion mechanism including the pinion shaft 7 and the rack shaft 8. The rack shaft 8 is supported by a housing 10 fixed to a vehicle body-side member (meaning the vehicle body itself or a member fixed to the vehicle body, the same hereinafter) 9. The rack shaft 8 can move in a vehicle-width direction (direction orthogonal to the surface of the paper) which is a width direction of the vehicle. Respective end portions of the rack shaft 8 are connected to the steering wheel (wheel) through a steering tie rod and a steering knuckle arm (not shown).

The steering shaft 3 includes an upper shaft 11 and a lower shaft 12 which are connected to be rotatable together and to be relatively movable in an axial direction X1, for example, using a spline connection. The steering shaft 3 is rotatably supported through bearings (an upper bearing 75 and a lower bearing 76) by the steering column 15 fixed to the vehicle body-side members 13 and 14.

The steering column 15 includes a cylindrical upper jacket 16 and a cylindrical lower jacket 17 which are fitted to the steering shaft 3 to be relatively movable in the axial direction X1 and a housing 18 connected to one end (lower end) of the lower jacket 17 in the axial direction X1. In the steering shaft 3, an intermediate portion between a front end portion (also referred to as a lower end portion) and a rear end portion (also referred to as an upper end portion) is accommodated in the steering column 15. The housing 18 is connected to the lower shaft 12 through the lower bearing 76. The upper jacket 16 is connected to the upper shaft 11 through the upper bearing 75 such that the upper jacket can move along with the upper shaft 11 in the axial direction X1. In this manner, the upper jacket 16 moves relatively to the lower jacket 17 in the axial direction X1 such that a telescoping adjustment of the steering column 15 and the steering shaft 3 can be performed.

A reduction mechanism 20, which decelerates a steering assisting electric motor 19 and transmits reduced power to the lower shaft 12, is accommodated in the housing 18. The reduction mechanism 20 has a drive gear 21 connected to be rotatable along with a rotating shaft (not shown) of the electric motor 19 and a driven gear 22 which meshes with the drive gear 21 and rotates along with the lower shaft 12.

When the steering is performed by the rotation of the steering member 2, the rotation of the steering member 2 is transmitted to the steering shaft 3, the universal joint 4, the intermediate shaft 5, the universal joint 6, and the pinion shaft 7, in this order, and is converted into a straight movement of the rack shaft 8 in the vehicle-width direction. In this manner, the steering of the steering wheel is performed. In addition, the drive of the electric motor 19 assists the rotation of the steering shaft 3, as necessary, and thus the steering of the steering member 2 is assisted.

In this manner, in the present embodiment, an example in which the steering device 1 is applied to an electric power steering device is described; however, the present invention may be applied to a manual steering device in which steering is performed without assisting by the electric motor 19.

Also, a lower bracket 59 fixed to the vehicle body-side member 14 supports a tilting central shaft 36 which is a pivot shaft. The tilting central shaft 36 supports the entire steering column 15 through the housing 18 of the steering column 15 such that the steering column can swivel around the tilting central shaft 36. The swiveling of the steering column 15 enables a tilt adjustment. Further, the present invention can be applied not only to a steering device including both the telescoping adjustment function and the tilt adjustment function, but also to a steering device including any one adjustment function.

Next, the periphery of the vehicle body-side member 13 in the steering device 1 will be described. Here, description will be provided using a right-left direction Y1 (the same as the above vehicle-width direction) which is an orthogonal direction with respect to the axial direction X1, as well as the front-rear and vertical directions or the axial direction X1 described above.

Figure 2:
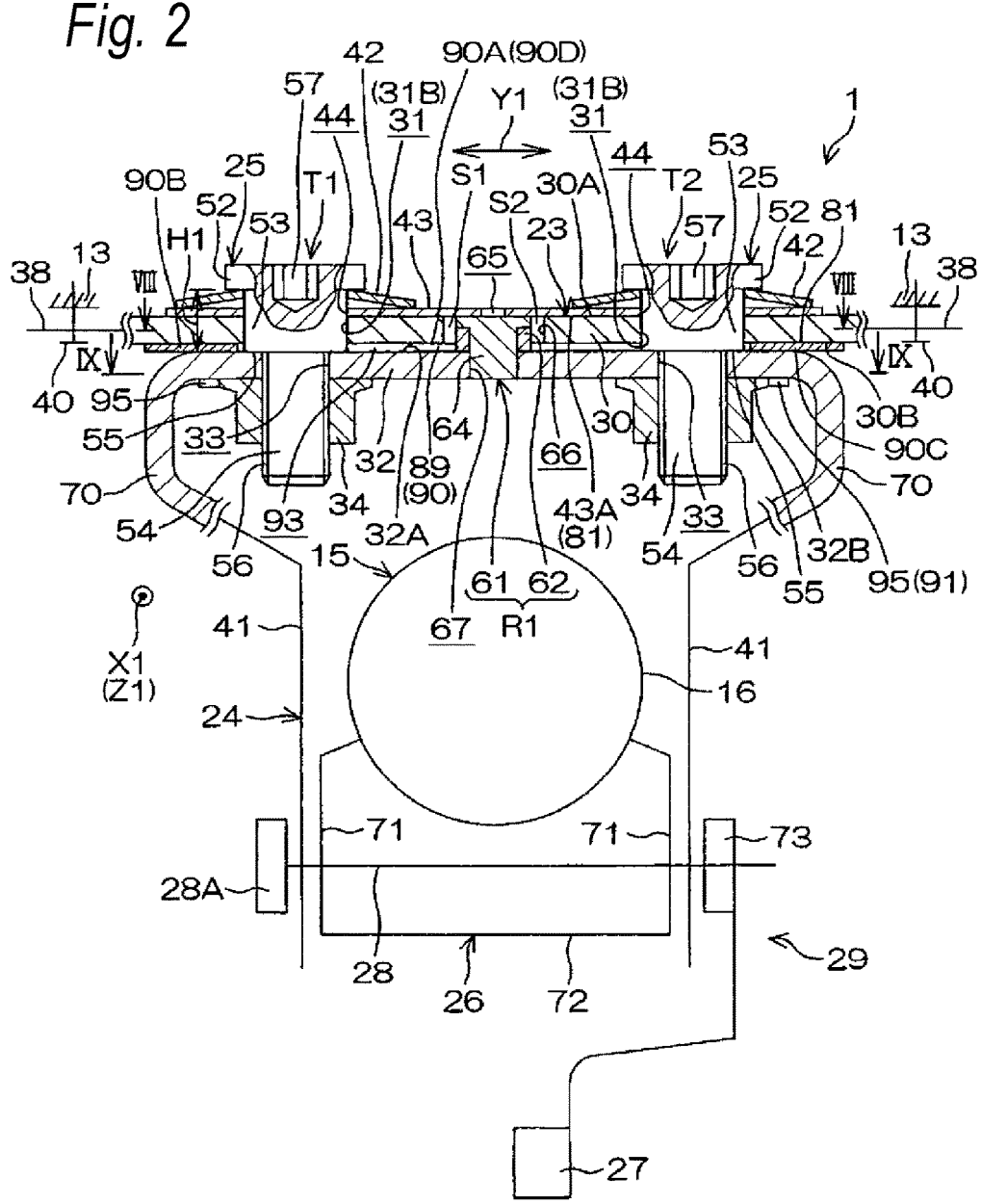
FIG. 2 is a schematic sectional view of the steering device 1 in FIG. 1 and shows a sectional plane taken along line II-II in FIG. 1.

As shown in FIG. 2 illustrating a schematic sectional view, the steering device 1 further includes a fixed bracket 23 fixed to the vehicle body-side member 13, a movable bracket 24 connected to the upper jacket 16, and a pair of suspending mechanisms T1 and T2. The movable bracket 24 is suspended from the fixed bracket 23 through the suspending mechanisms T1 and T2. In other words, the upper jacket 16 connected to the movable bracket 24 is suspended from the fixed bracket 23.

Figure 3:
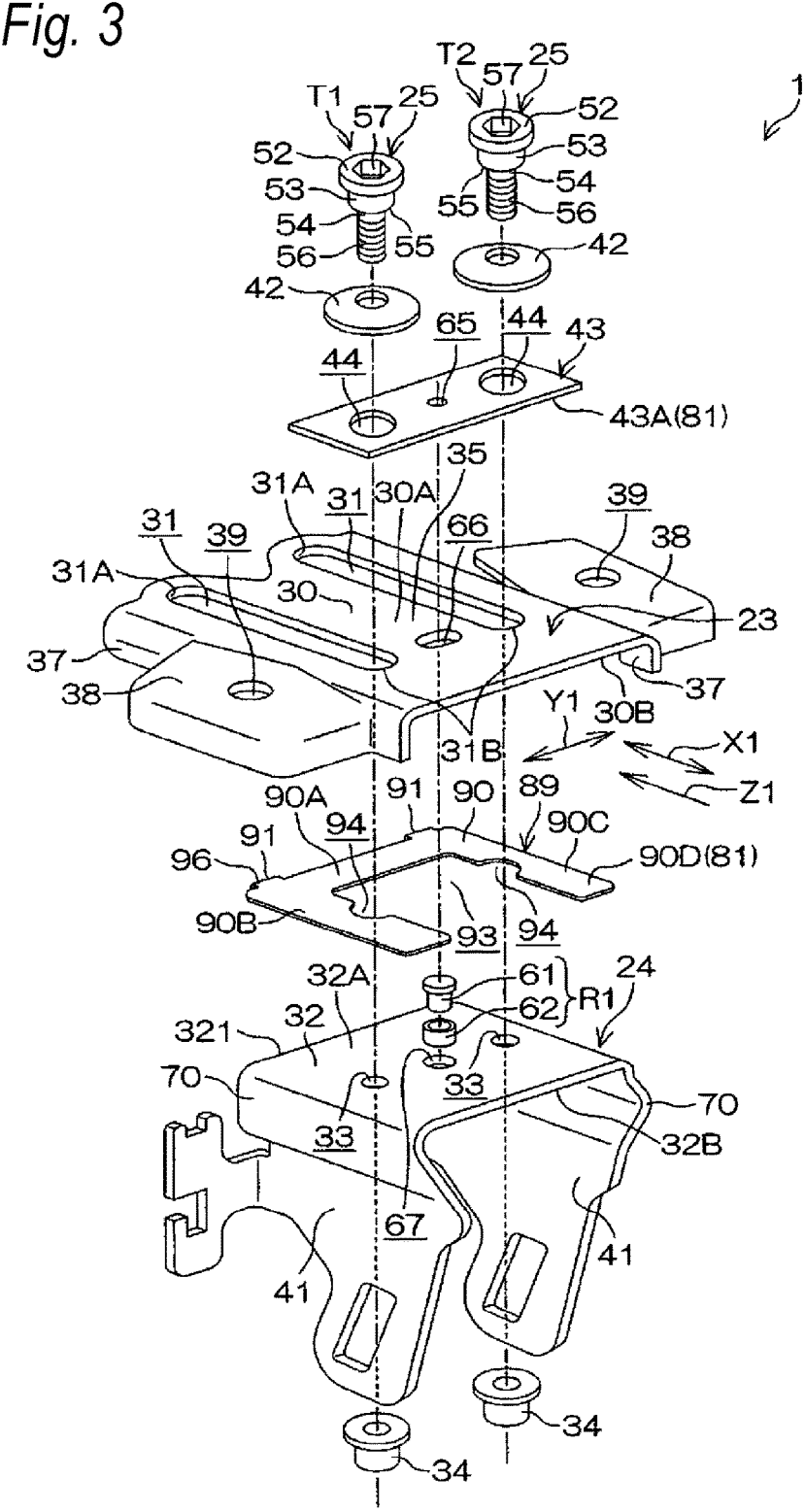
FIG. 3 is an exploded perspective view of the steering device 1 in FIG. 1.

Next, also with reference to FIG. 3 showing an exploded perspective view of the steering device 1, the fixed bracket 23, the movable bracket 24, and the suspending mechanisms T1 and T2 will be described. Further, in FIG. 3, the upper left side is the front side of the steering device 1 and the lower right side is the rear side of the steering device 1.

The fixed bracket 23 is also referred to as an upper bracket and, for example, is formed of sheet metal. The fixed bracket 23 includes a flat plate-shaped first plate 30 extending both in the axial direction X1 and the right-left direction Y1, a pair of side plates 37 provided to extend downward from a pair of side edges (outer side edges in the right-left direction Y1) of the first plate 30, respectively, and a pair of attachment plates 38 provided to extend outward (in the right-left direction Y1) from the pair of side plates 37, respectively. A top surface 30A and a under surface 30B of the first plate 30 are flat both in the axial direction X1 and in the right-left direction Y1. The attachment plates 38 are fixed to the vehicle body-side member 13 using a metallic fixing bolt 40 (refer to FIG. 5) inserted from below through an insertion hole 39 formed in the attachment plates 38 (refer to FIG. 2). In this manner, the fixed bracket 23 is fixed to the vehicle body-side member 13.

The movable bracket 24 is also referred to as an upper bracket and is formed of sheet metal or the like, similar to the fixed bracket 23. The movable bracket 24 includes a flat plate-shaped second plate 32 (plate-shaped section) extending parallel to the first plate 30, and a pair of side plates 41 provided to extend downward from a pair of side edges (outer side edges in the right-left direction Y1) of the second plate 32, respectively, and the fixed bracket has a vertically inverted U shape. In this manner, the pair of side plates 41 are curved in the same direction from both sides (to be more exact, both end portions) of the second plate 32 in the right-left direction Y1 and form a pair of curved sections. The second plate 32 has a substantially rectangular shape (a substantially square shape in FIG. 3) having two sides extending in the axial direction X1 and two sides extending in the right-left direction Y1. The top surface 32A of the second plate 32 has substantially the same rectangular shape as the second plate 32 in a plan view and the entire region of the top surface 32A is flat both in the axial direction X1 and in the right-left direction Y1. The movable bracket 24 is positioned immediately under the fixed bracket 23 and the top surface 32A of the second plate 32 of the movable bracket 24 is disposed to face, from below, the first plate 30 of the fixed bracket 23. That is, the top surface 32A of the second plate 32 corresponds to a facing surface of the movable bracket 24, which faces the fixed bracket 23. Connection sections 70 between the second plate 32 and the side plates 41 may be formed to have a curved shape which sticks out in the right-left direction Y1 as shown in FIG. 3.

Also, as shown in FIG. 1 and FIG. 2, the steering device 1 includes a locking mechanism 29. In short, the locking mechanism 29 locks a column jacket 26 at a position unlocks the column jacket, through the movable bracket 24 using a fastening shaft 28 which moves in the right-left direction Y1 in response to an operation of the operation lever 27 by an operator. In this manner, the locking mechanism 29 locks the upper jacket 16 and the steering member 2 at positions or unlocks the members.

Regarding the locking mechanism 29, as shown in FIG. 2, the column jacket 26 described above is fixed to the upper jacket 16 of the steering column 15. The column jacket 26 having a U shape includes a pair of side plates 71 facing the side plates 41 on the inner side of the pair of side plates 41 of the movable bracket 24 and a connection plate 72 which connects lower ends of the pair of side plates 71.

The fastening shaft 28 described above is configured of a bolt which penetrates through the movable bracket 24 and side plates 41 and 71 of the column jacket 26 in the right-left direction Y1. Accordingly, the column jacket 26, which is fixed to the upper jacket 16, and the movable bracket 24 are connected through the fastening shaft 28. In addition, as described above, since the steering member 2 is connected to the upper shaft 11 and the upper jacket 16 is connected to the upper shaft 11 (refer to FIG. 1), the steering member 2 and the upper jacket 16 are connected. The upper jacket 16 is connected to the upper shaft 11 through the upper bearing 75. Hence, the movable bracket 24 is connected to the steering member 2.

Also, a nut 73 which is screwed with the fastening shaft 28 is caused to rotate by a rotating operation of the operation lever 27, and thereby both the side plates 41 and 71 are fastened between a head portion 28A of a bolt and the nut 73 on the fastening shaft 28 and both the side plates 41 and 71 are locked. In this manner, the steering member 2 can be locked at a position after the telescoping adjustment or the tilting adjustment. Meanwhile, when the operation lever 27 is operated to reversely rotate, both the side plates 41 and 71 are unfastened (locked). Therefore, it is possible to perform the telescoping adjustment and the tilting adjustment.

As shown in FIG. 3, long grooves 31 which extend straight in the axial direction X1 (front-rear direction) are formed in the first plate 30 of the fixed bracket 23 by punching or cutting through press working. Meanwhile, insertion holes 33 are formed in the second plate 32 of the movable bracket 24. The long grooves 31 and the insertion holes 33 are provided in pairs to correspond to the pair of suspending mechanisms T1 and T2.

A pair of long grooves 31 penetrate the first plate 30 in the plate-thickness direction and are arranged at an interval in the right-left direction Y1 parallel to each other. In a plan view of the steering device 1 viewed from above, both end portions (both front and rear end portions 31A and 31B) of the long groove 31 in the axial direction X1 are rounded to have an arc shape.

In addition, a partition portion 35 partitioning the pair of long grooves 31 is formed integrally with the first plate 30. The partition portion 35 extends to have a belt shape in the axial direction X1 between the pair of long grooves 31 as a part of the fixed bracket 23. A first through-hole 66 which penetrates through the partition portion 35 (first plate 30) is formed in one end portion (rear end portion) of the partition portion 35 in the axial direction X1. Both distances between the first through-hole 66 and the respective long grooves 31 are equal in the right-left direction Y1.

The pair of insertion holes 33, are round holes penetrating through the second plate 32 in the plate-thickness direction, are arranged at an interval in the right-left direction Y1, and face, from below, a part of the long grooves 31 which are disposed at the same positions in the right-left direction Y1. That is, the pair of insertion holes 33 face the pair of long grooves 31, respectively. A second through-hole 67 which penetrates through the second plate 32 in the plate-thickness direction is formed between the pair of insertion holes 33 in the right-left direction Y1 in the second plate 32. Both distances between the second through-hole 67 and the respective insertion holes 33 are equal in the right-left direction Y1. Further, the first through-hole 66 and the second through-hole 67 are holes into which a pin 61 to be described below is inserted and will be described below in detail.

Also, in a normal state except for at the time of a second collision, the pair of insertion holes 33 (in the movable bracket 24) face the ends (rear end portions 31B) of the pair of long grooves 31 (in the fixed bracket 23), respectively, (refer to FIG. 1).

Each of the suspending mechanisms T1 and T2 are configured of a suspending member 25, a flat spring 42 such as a disc spring, a nut 34, and a sliding plate 43. Suspending members 25, flat springs 42, and nuts 34 are provided in pairs (two) to correspond to the suspending mechanisms T1 and T2, respectively, and are arranged parallel to the right-left direction Y1.

The suspending member 25 is a bolt which vertically extends and has a head portion 52 on the top end thereof. The suspending members 25 are inserted from above into the rear end portion 31B of the long groove 31 (of the first plate 30) and the insertion hole 33 (of the second plate 32), respectively, which are in a state of facing each other. Also, the lower end portion of each of the suspending members 25 is screwed with the nut 34. In this manner, the respective suspending members 25 connect the first plate 30 and the second plate 32 together with the nut 34 and extend from the fixed bracket 23 such that the movable bracket 24 is suspended (refer to FIG. 2). In other words, the column jacket 26 and the upper jacket 16 are suspended through the suspending members 25.

In addition, with reference to FIG. 1, the suspending members 25 can move to the front side in the axial direction X1 at the time of the second collision along the long grooves 31, along with the movable bracket 24, the column jacket 26, the upper jacket 16, the upper shaft 11 and the steering member 2. The movable bracket 24, the column jacket 26, the upper jacket 16, the upper shaft 11 and the steering member 2 are collectively referred to as "movable members". At this time, the long grooves 31 guide the movement of the suspending members 25 at the time of the second collision. In addition, at this time, the movable bracket 24 moves to the front side relatively to the fixed bracket 23 in the axial direction X1, along with the steering member 2. Here, when a sign "Z1" is applied to the movement direction of the movable bracket 24 at the time of the second collision, the axial direction X1 is parallel to the movement direction Z1 and the front side in the axial direction X1 is referred to as the downstream side in a predetermined movement direction Z1. Further, the housing 18 of the steering column 15 may be detached from the lower bracket 59 on the vehicle side, as necessary, such that the suspending member 25 and the movable member can smoothly move.

Also, the sliding plate 43 described above is a thin plate which is long in the right-left direction Y1 and, as shown in FIG. 2, is interposed between both flat springs 42 and the top surface 30A of the first plate 30 in a state in which a plate-thickness direction of the sliding plate matches that of the first plate 30. A friction-reducing material 81 formed of fluorine resin or polytetrafluoroethylene is provided on at least an entire surface of the sliding plate 43 on the first plate 30 side (also refer to FIG. 6 and FIG. 7 to be described below). At least the surface of the sliding plate 43 on the first plate 30 side is the under surface and is a sliding surface 43A. Further, the entire sliding plate 43 may be formed of the friction-reducing material 81 and only the sliding surface 43A of the sliding plate 43 may be covered with the friction-reducing material 81. Second insertion holes 44, which penetrate the sliding plate 43 in the plate-thickness direction, are formed in the sliding plate 43 at positions facing the pair of insertion holes 33 in the movable bracket 24, respectively. These second insertion holes 44 are aligned in the right-left direction Y1. That is, the pair of second insertion holes 44 are formed at the same position in the right-left direction Y1.

Each of the suspending members 25 is inserted, from above, into the annular flat spring 42, the second insertion hole 44 corresponding to the sliding plate 43, the long groove 31 corresponding to the first plate 30, and the insertion hole 33 corresponding to the second plate 32, in this order and the suspending member is screwed with the nut 34 on the lower side of the second plate 32. In this manner, the movable bracket 24 is suspended through the suspending members 25.

At the time of the second collision, the suspending members 25 move along with the movable bracket 24 along the long grooves 31 of the fixed bracket 23, and at that time, the sliding plate 43 can move along with the pair of suspending members 25 by sliding on the fixed bracket 23 to the front side (downstream side in the movement direction Z1). The sliding surface 43A, described above, of the sliding plate 43 slides on the top surface 30A of the first plate 30 of the fixed bracket 23.

Figure 4:
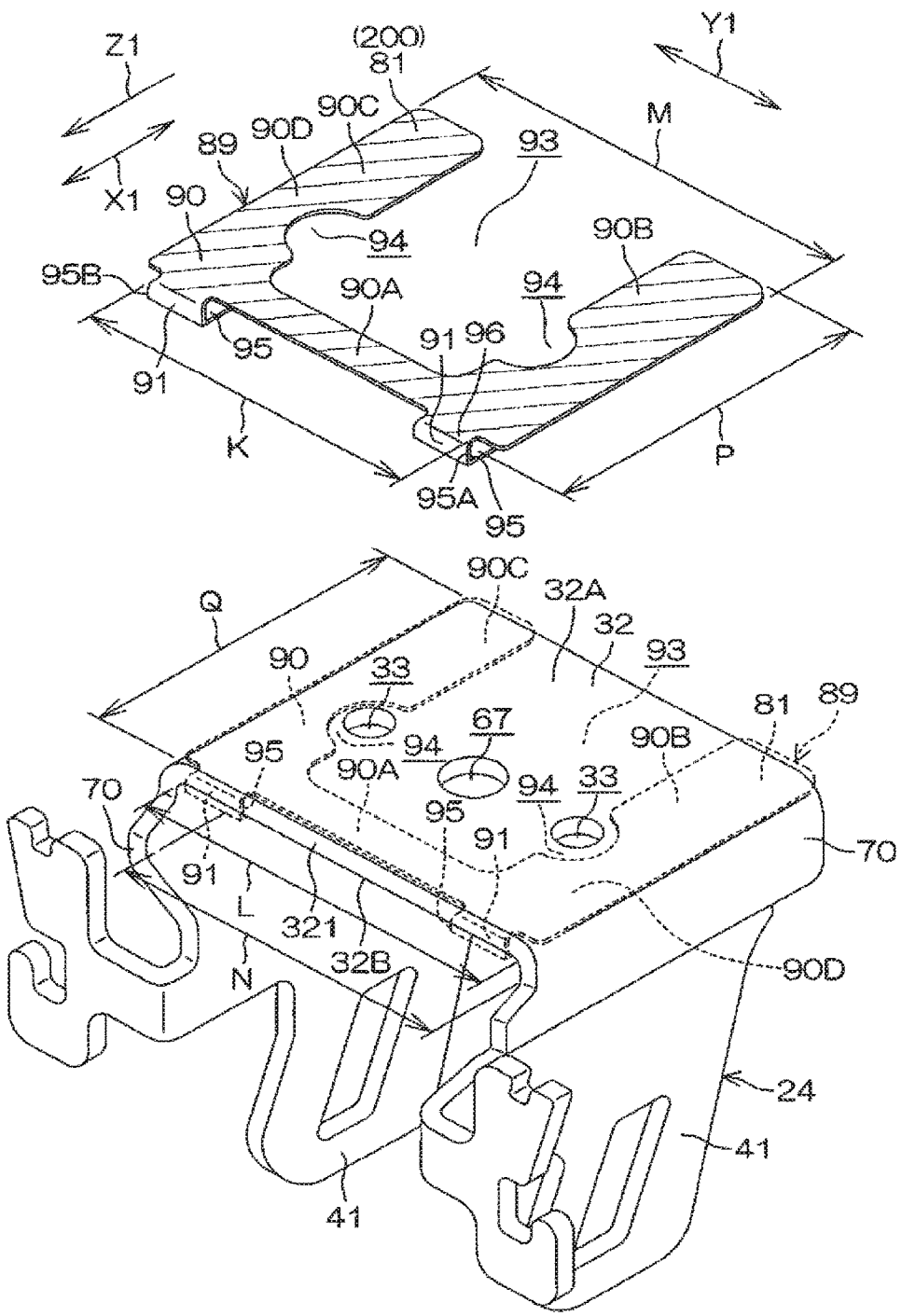
FIG. 4 is an exploded perspective view for depicting an assembly of a movable bracket 24 and a sliding member 89.

Here, the steering device 1 further includes a sliding member 89 such that friction (sliding resistance) between the first plate 30 of the fixed bracket 23 and the second plate 32 of the movable bracket 24 is reduced at the time of the second collision. Further, for the convenience of description, views (FIG. 1 or the like), in which the sliding member 89 is omitted not to be shown, are provided. As shown in FIG. 3, the sliding member 89 includes a main body section 90 and a bent portion 91 (attaching section) which are integrated. The sliding member 89 is described with reference to FIG. 4. In FIG. 4, the lower left side of the paper surface means the front side of the steering device 1 and the upper right side thereof means the rear side of the steering device 1. In addition, the sliding member 89 is assembled to the movable bracket 24 as will be described below; however, in FIG. 4, the sliding member 89, which is not yet assembled, is illustrated in a solid line and the sliding member 89, which is assembled, is illustrated in a dotted line, for the convenience of the description.

The main body section 90 has a thin plate shape and is disposed to be parallel to each of the first plate 30 and the second plate 32. When the main body section is viewed in the plate-thickness direction, the main body section 90 has a U shape edged with an outline of the second plate 32 except for a rear end portion when viewed in the plate-thickness direction. The U shape is opened toward the rear side. With an orientation of the sliding member 89 in FIG. 3 as a reference, the right edge and the left edge of the main body section 90 extend in the axial direction X1 in parallel and are a pair of right and left sides of an outline of the main body section 90 when viewed in the plate-thickness direction. In addition, the frond edge and the rear edge of the main body section 90 extend in the right-left direction Y1 substantially in parallel and are a pair of front and rear sides of the outline of the main body section 90. Here, the rear edge is cut at the center in the right-left direction Y1.

Here, in the main body section 90, a sign "90A" is assigned to the front end portion, a sign "90B" is assigned to the left end portion, and a sign "90C" is assigned to the right end portion.

The front end portion 90A of the main body section 90 is the downstream-side end portion of the main body section 90 in the movement direction Z1 described above and has a belt shape extending in the right-left direction Y1. The left end portion 90B of the main body section 90 is one end portion in the right-left direction Y1 (orthogonal direction with respect to the movement direction Z1) and has a belt shape extending toward the rear side from the front end portion 90A in the axial direction X1. The right end portion 90C of the main body section 90 is the other end portion in the right-left direction Y1 and has a belt shape extending toward the rear side from the front end portion 90A in the axial direction X1. The left end portion 90B and the right end portion 90C have the same dimension as each other in the axial direction X1. Also, the main body section 90 has the U shape described above, with the front end portion 90A, the left end portion 90B, and the right end portion 90C.

In addition, a cutout portion 93 is formed in the main body section 90. The cutout portion 93 is an inner portion of the U-shaped main body section 90 described above, and thus a space surrounded by the front end portion 90A, the left end portion 90B, and the right end portion 90C. The main body section 90 is cut out from the center (cut portion as described above) of the rear edge of the main body section 90 in the right-left direction Y1 toward the front side such that the cutout portion 93 reaches the front of the front end portion 90A. A notch 94 formed to have an arc shape outward in the right-left direction Y1 is formed at a portion of each of the left end portion 90B and the right end portion 90C, with which the cutout portion 93 is edged. The notches 94 are provided at the same position in the left end portion 90B and the right end portion 90C, respectively, in the axial direction X1, and are parts of the cutout portion 93.

As shown in FIG. 4, the bent portions 91 are provided on both end sides of the front end portion 90A in the right-left direction Y1, respectively, and thus (two in sum) bent portions are formed. The bent portions 91 are provided slightly on the inner side from both edges in the right-left direction Y1. Each of the bent portions 91 slightly extends out from the front end portion 90A toward the front side and is bent downward from the front end portion 90A such that a substantial right angle is formed between the main body section 90 and the bent portion. Further, the portions of the bent portions 91, which extend out from the front end portion 90A to the front side may be parts of the main body section 90 (front end portion 90A). The bent portion 91 has a hook shape. The plate thickness of the bent portion 91 is equal to the plate thickness of the main body section 90. In addition, a distal end portion (lower end portion in FIG. 4) of the bent portion 91 on a side opposite to the main body section 90 side is bent to the rear side (upstream side in the movement direction Z1). When the distal end portion is referred to as a holding portion 95, the holding portion 95 extends parallel to the main body section 90 and faces the front end portion 90A of the main body section 90 from below with a gap (corresponding to the plate thickness of the second plate 32).

As above, the sliding member 89 has a shape which is vertically symmetrical with the center in the right-left direction Y1 as a reference.

Here, a plurality of (here, two right and left) holding portions 95 are considered as one holding portion 95 and one edge 95A and the other edge 95B of the one holding portion 95 are defined in the right-left direction Y1. According to the embodiment, the one edge 95A is a left edge of the holding portion 95 on the left side (right side in FIG. 4) of the actual two holding portions 95 and the other edge 95B is a right edge of the holding portion 95 on the right side (left side in FIG. 4). Alternatively, the one edge 95A may be the right edge of the holding portion 95 on the right side and the other edge 95B may be the left edge of the holding portion 95 on the left side. In any case, a distance K between one edge 95A and the other edge 95B of the holding portion 95 in the right-left direction Y1 is equal to a distance L between a pair of side plates 41 on boundaries between the pair of side plates 41 and the second plate 32 of the movable bracket 24. To be more exact, the distance K may be slightly smaller than the distance L. Meanwhile, the maximum dimension M of the main body section 90 in the right-left direction Y1 is greater than the maximum distance N between the pair of side plates 41. The maximum distance N is a distance between the connection sections 70 described above and has a size equal to or greater than the distance L.

In addition, a dimension P of the main body section 90 in the axial direction X1 is a dimension of the front end portion 90A and the left end portion 90B in unity in the axial direction X1 and is also a dimension of the front end portion 90A and the right end portion 90C in unity in the axial direction X1. Here, a portion of the bent portion 91, which extends out from the front end portion 90A to the front side, is included in the front end portion 90A. The dimension P is equal to or greater than a dimension Q of the top surface 32A of the second plate 32 of the movable bracket 24 described above in the axial direction X1.

Since such a sliding member 89 has the cutout portion 93 formed in one thin plate, the bent portion 91 (including the holding portion 95) is formed by performing a bending process on the thin plate, and thereby the sliding member is manufactured as a component having one piece structure (structure which is not divided into a plurality of components). Further, a round-chamfered portion 96 is just formed at a bending portion in each of the bent portions 91. The round-chamfered portion 96 has an arc shape having a round corner on the bending portion. In addition, edges of the sliding member 89 are rounded so as not to be sharpened. Particularly, the front edge of the top surface 90D of the main body section 90 or an edge of the cutout portion 93 is rounded so as not to be sharpened.

Also, as shown in FIG. 4, the sliding member 89 is assembled to the second plate 32 of the movable bracket 24 from right above in a state in which the bent portions 91 are formed downward. The main body section 90 of the sliding member 89 (portion of the dotted line), which is assembled, is mounted on the second plate 32 from above along over the top surface 32A of the second plate 32 such that the main body section substantially overlaps with the outline of the second plate 32 in a plan view. As described above, since the dimension P of the main body section 90 of the sliding member 89 in the axial direction X1 is equal to or greater than the dimension Q of the top surface 32A of the second plate 32 in the axial direction X1, the main body section 90 of the sliding member 89 in this state is provided over the entire region of the top surface 32A in the axial direction X1 (movement direction Z1).

In addition, the left end portion 90B and the right end portion 90C of the main body section 90 are mounted on both end portions of the top surface 32A in the right-left direction Y1. Also, the second through-hole 67 of the second plate 32 and both insertion holes 33 are completely exposed in the main body section 90 through the cutout portion 93. Each of the insertion holes 33 is fitted through the notch 94 (at the same position in the right-left direction Y1) of the cutout portion 93 from the inner side in the right-left direction Y1. Also, the right and left bent portions 91 are latched to the movable bracket 24 (front end portion 321 of the second plate 32) from the front side (downstream side in the movement direction Z1 described above). In addition, the holding portions 95 on the distal end of the bent portions 91 are disposed between the pair of side plates 41 of the movable bracket 24 and the front end portion 321 of the second plate 32 is interposed between the front end portion 90A of the main body section 90 and the holding portion (refer to FIG. 6 and FIG. 7 to be described below).

In addition, the friction-reducing material 81 described above is provided on at least the entire region of the top surface 90D of the main body section 90 of the sliding member 89. The friction-reducing material 81 is provided on the entire region of the top surface 90D including a top surface of the portion extending out from the main body section 90 of each of the bent portions 91 to the front side. It is needless to say that the entire sliding member 89 may be configured of the friction-reducing material 81.

With reference to FIG. 2, in the state in which each of the suspending members 25 extends from the fixed bracket 23 as described above, and the movable bracket 24 is suspended, the main body section 90 of the sliding member 89 assembled to the movable bracket 24 is inserted between the top surface 32A of the second plate 32 of the movable bracket 24 and the first plate 30 of the fixed bracket 23. The top surface 90D of the main body section 90 comes into surface contact with the under surface 30B of the first plate 30 through the friction-reducing material 81, from below. Accordingly, in this state, the sliding member 89 is invariably interposed between the top surface 32A of the second plate 32 (movable bracket 24) and the under surface 30B of the first plate 30 (fixed bracket 23), and thus the movable bracket 24 is not brought into direct contact with the fixed bracket 23.

Next, with reference to FIG. 3, in detailed description of the suspending member 25, each of the suspending members 25 includes the flange-like head portion 52 described above, a large-diameter portion 53 which is continuous to the head portion 52 and has a diameter smaller than the head portion 52, a small-diameter portion 54 which is continuous to the large-diameter portion 53 and has a diameter smaller than that of the large-diameter portion 53, a step portion 55 formed between the large-diameter portion 53 and the small-diameter portion 54, and a threaded portion 56 provided in the small-diameter portion 54, which are integral with each other. A tool engaging portion 57 having, for example, a hexagonal shape is provided in the head portion 52.

As shown in FIG. 2, in a normal state except for the second collision, the head portion 52 of the suspending member 25 is engaged with the flat spring 42 from above. In addition, the large-diameter portion 53 of the suspending member 25 is inserted into a hollow portion of the flat spring 42, the second insertion hole 44 of the sliding plate 43, and the rear end portion 31B of the long groove 31. In this manner, the sliding plate 43 is interposed between the head portions 52 of the suspending members 25 and the fixed bracket 23 (edges of the long grooves 31). The step portion 55 passes through the cutout portion 93 of the sliding member 89, comes into contact with the top surface 32A of the second plate 32, and is received on the top surface 32A. The second plate 32 is pinched between the step portion 55 and the nut 34 and the suspending member 25 and the second plate 32 are fixed.

A distance H1 (corresponding to an axial length of the large-diameter portion 53) between the head portion 52 and the step portion 55 is slightly greater than a sum of the plate thickness of the main body section 90 of the sliding member 89 interposed between the first plate 30 and the second plate 32, the plate thickness of the first plate 30, the plate thickness of the sliding plate 43 along the top surface 30A of the first plate 30, and the plate thickness of the flat spring 42 at the time of the maximum compression. In this manner, the flat spring 42 elastically biases the first plate 30 toward the second plate 32 through the sliding plate 43.

Figure 5:
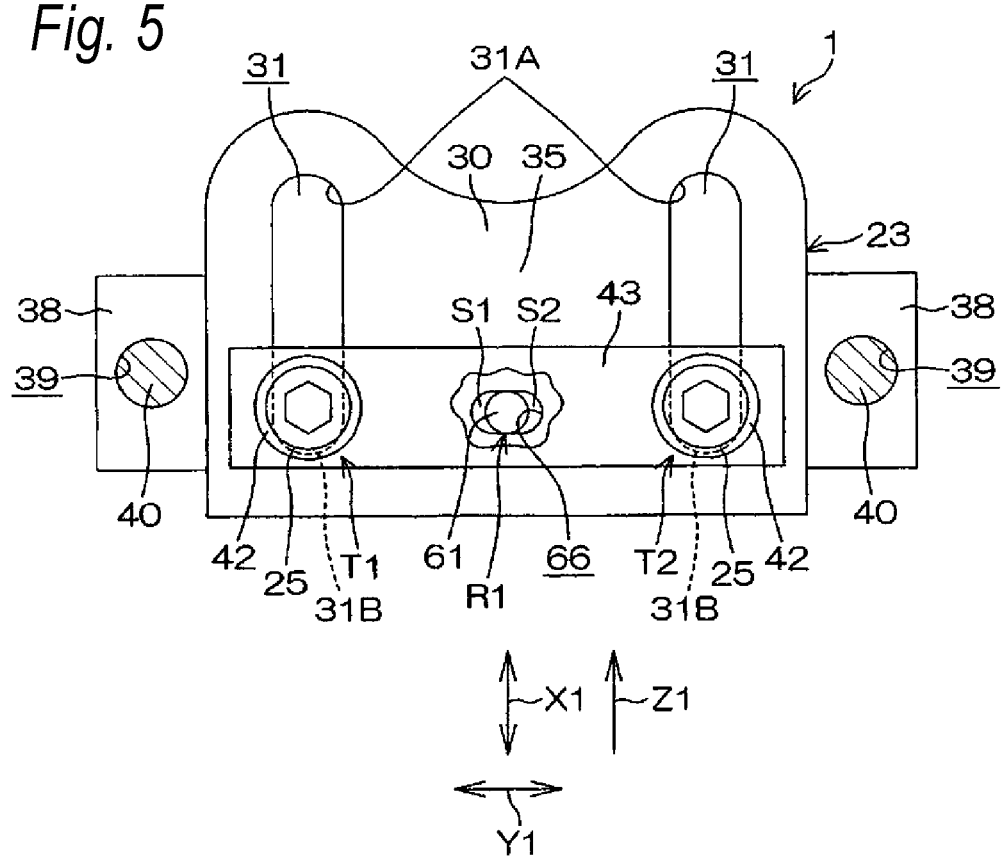
FIG. 5 is a schematic plan view of a fixed bracket 23, a pair of suspending mechanisms T1 and T2, and a connection/disconnection mechanism R1, which are partially broken.

In the normal state described above, the suspending members 25 are positioned in the rear end portions 31B of the long grooves 31 (refer to FIG. 5). A position of the movable bracket 24 (second plate 32) in the axial direction X1 (movement direction Z1) at that time is referred to as an initial position (also refer to FIG. 1, FIG. 2, and FIG. 6).

Figure 7:
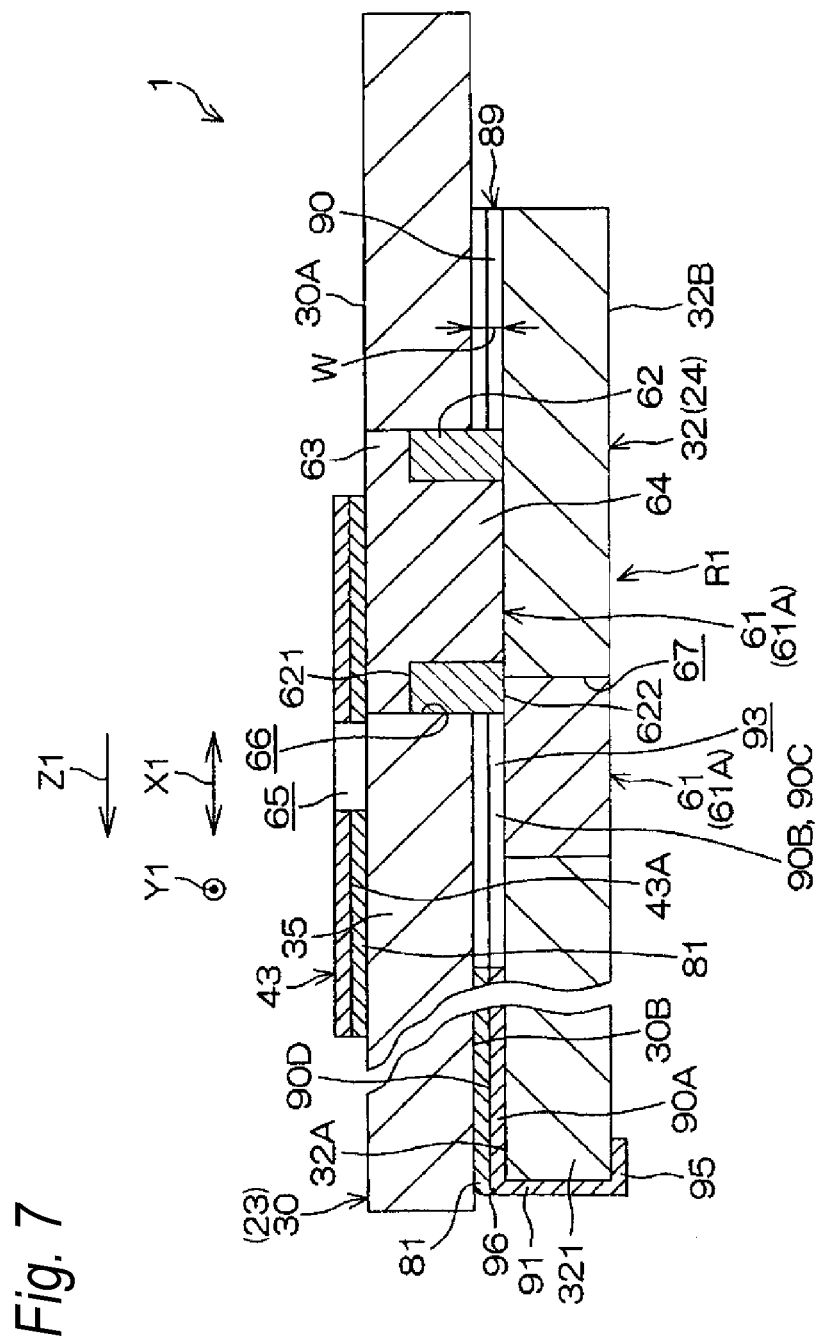
FIG. 7 is a sectional view of the first plate 30 and the second plate 32 at the time of the second collision and shows a state in which the second plate 32 is disconnected from the state in FIG. 6 due to shearing of the pin 61 and moves to the downstream side in a predetermined movement direction Z1.

Also, the steering device 1 includes a connection/disconnection mechanism R1. The connection/disconnection mechanism R1 causes the fixed bracket 23 and the movable bracket 24 to be connected and causes the movable bracket 24 to be disconnected from (move relatively to) the first plate 30 toward the front side (downstream side in the movement direction Z1) in the axial direction X1 as shown in FIG. 7 from the initial position at the time of the second collision.

As shown in FIG. 2 and FIG. 5 showing a schematic plan view in which a part is broken, the connection/disconnection mechanism R1 is disposed between the pair of suspending mechanisms T1 and T2 in the right-left direction Y1. That is, the connection/disconnection mechanism R1 is disposed between the pair of long grooves 31 of the first plate 30 of the fixed bracket 23. Specifically, the connection/disconnection mechanism R1 is disposed at the central position between the pair of long grooves 31 (that is, between the pair of suspending members 25) in the right-left direction Y1. The connection/disconnection mechanism R1 is formed of the resin pin 61 which is sheared (broken) at the time of the second collision and a cylindrical metal collar 62 fitted to a part of the pin 61 in the axial direction (refer to FIG. 3).

Further, a collar made of a resin having high hardness, ceramics, or the like may be used instead of the metal collar 62.

Figure 6:
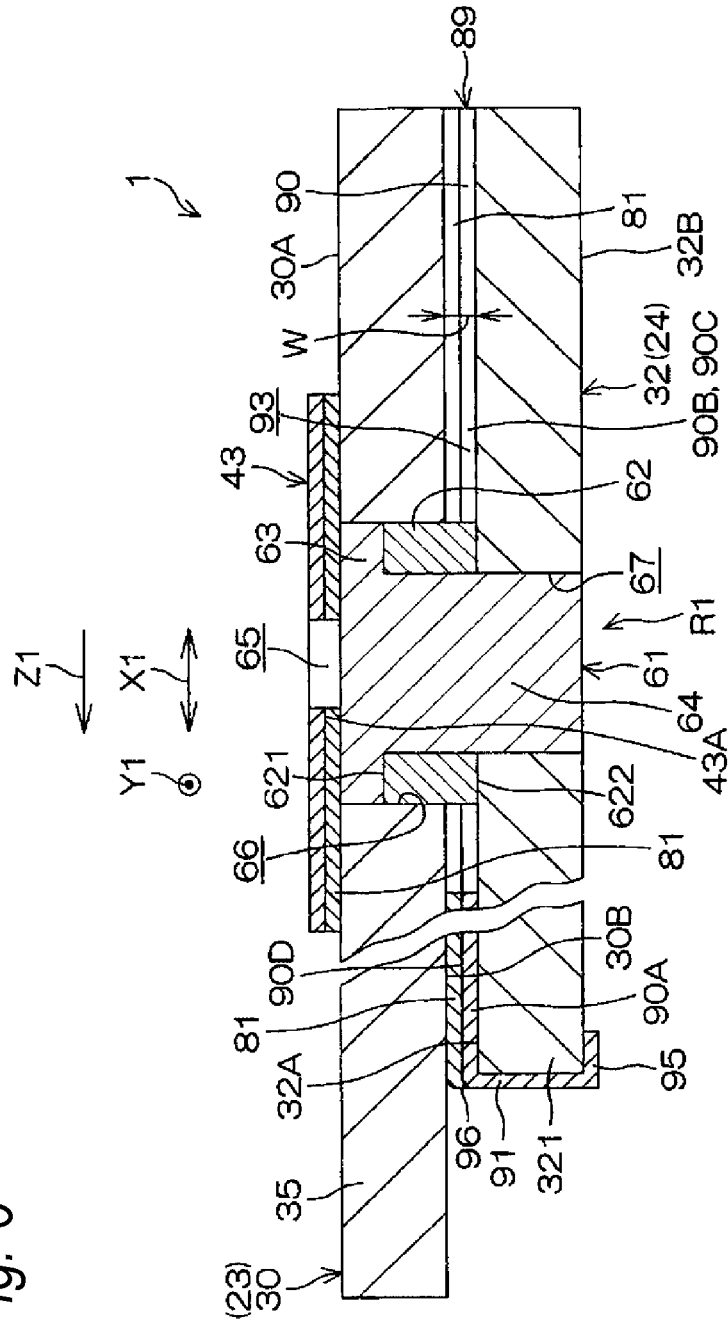
FIG. 6 is a sectional view of a first plate 30 of the fixed bracket 23 and a second plate 32 of the movable bracket 24 which are in a connection state and shows a sectional plane in a front-rear direction, including the axial line of the pin 61.

With reference to FIG. 6, the pin 61 of the connection/disconnection mechanism R1 includes a circular head portion 63 in a sectional view and a columnar shaft 64 which has a diameter having a diameter smaller than that of the head portion 63. The cylindrical metal collar 62 is fitted to the outer circumference of the shaft 64. The outer diameter of the metal collar 62 is equal to an outer diameter of the head portion 63 if the pin 61.

In the normal state described above, the first through-hole 66 of the first plate 30 of the fixed bracket 23 and the second through-hole 67 of the second plate 32 of the movable bracket 24 vertically face each other at a position (inside region of the cutout portion 93 of the sliding member 89) in the axial direction X1 (movement direction Z1) and in the right-left direction Y1. At this time, the head portion 63 of the pin 61 and most of the metal collar 62 are inserted into the first through-hole 66 of the first plate 30 of the fixed bracket 23. A part of the metal collar 62 protrudes downward from the first through-hole 66. A portion of the shaft 64 of the pin 61, which protrudes from the metal collar 62, is inserted into the second through-hole 67 of the second plate 32 of the movable bracket 24. That is, the pin 61 is inserted into both the first through-hole 66 and the second through-hole 67 which are in a facing state. In this manner, the pin 61 positions the movable bracket 24 with respect to the fixed bracket 23.

A first end portion 621 (upper end portion in FIG. 6) of the metal collar 62 in the axial direction comes into contact with the head portion 63 of the pin 61 and a second end portion 622 (lower end portion in FIG. 6) of the metal collar 62 in the axial direction is received on the top surface 32A of the second plate 32. In this manner, the pin 61 and the metal collar 62 are prevented from escaping downward from the second plate 32.

Meanwhile, the sliding plate 43 is disposed to cover an upper side of the head portion 63 of the pin 61, and thereby the pin 61 is prevented from escaping upward. In addition, in the sliding plate 43, a peephole 65 having a diameter smaller than the outer diameter of the head portion 63 is formed to face the head portion 63 of the pin 61. After assembly of the connection/disconnection mechanism R1, the head portion 63 of the pin 61 is viewed through the peephole 65 of the sliding plate 43, and thereby it is possible to easily determine whether or not working failure such as forgetting to assemble the pin 61 occurs.

Figure 8:
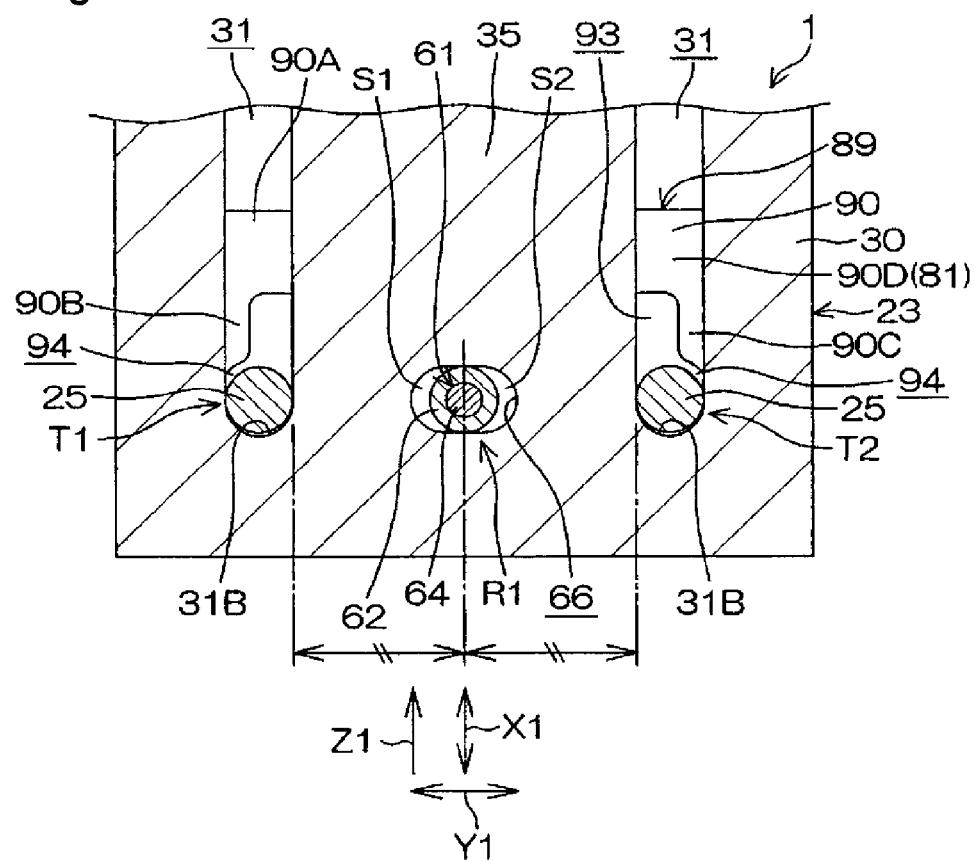
FIG. 8 is a sectional view taken along line VIII-VIII in FIG. 2 and shows a sectional plane of the first plate 30 and the connection/disconnection mechanism R1.

As shown in FIG. 8 showing a sectional plane along line VIII-VIII in FIG. 2, the first through-hole 66 of the first plate 30 is disposed at the central position between the long grooves 31 for the suspending mechanisms T1 and T2 in the right-left direction Y1. That is, the pin 61 is disposed at the central position between the pair of suspending members 25 in the right-left direction Y1.

In addition, the first through-hole 66 of the first plate 30 is formed as an oblong hole which is long in the right-left direction Y1. In this manner, gaps S1 and S2 are provided between the outer periphery of the metal collar 62 and the inner periphery of the first through-hole 66 in the right-left direction Y1.

Figure 9:
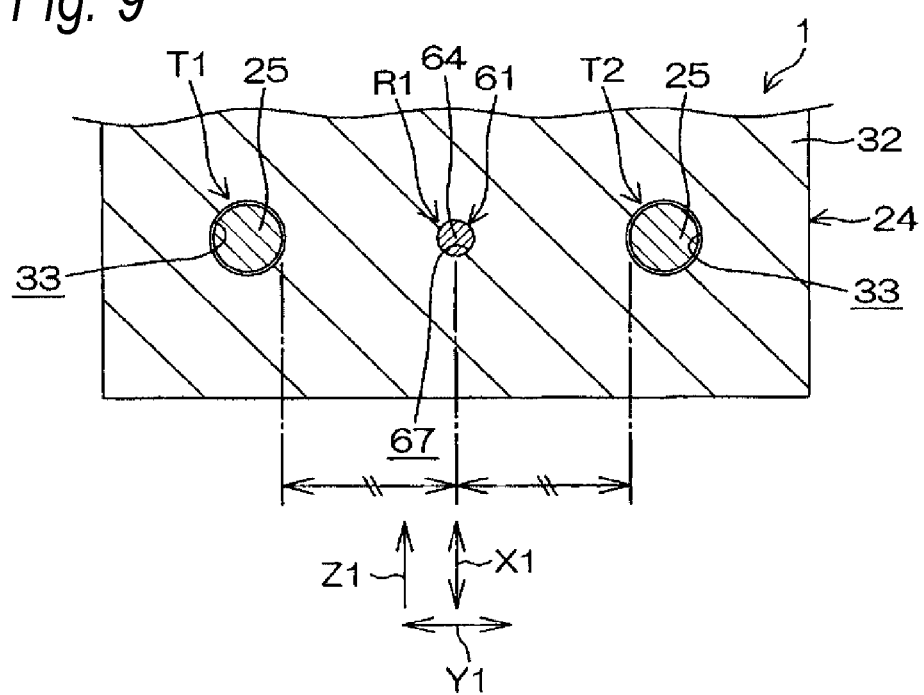
FIG. 9 is a sectional view taken along line IX-IX in FIG. 2 and shows a sectional plane of the second plate 32 and the connection/disconnection mechanism R1.

As shown in FIG. 9 along line IX-IX in FIG. 2, one second through-hole 67 of the second plate 32 of the movable bracket 24 is disposed at the central position between the pair of insertion holes 33 in the right-left direction Y1. The second through-hole 67 is formed of a circular hole having an inner diameter equal to or slightly greater than the outer diameter of the shaft 64 of the pin 61.

As shown in FIG. 7, at the time of the second collision, the first through-hole 66 and the second through-hole 67 are shifted. A surface formed when the second end portion 622 of the metal collar 62 faces the second plate 32 is shifted following the above shift, and thereby the shaft 64 of the pin 61 is sheared (broken) at a position between the first through-hole 66 and the second through-hole 67. A shearing edge formed of an inner circumferential edge of the second end portion 622 of the metal collar 62 has an arc shape (refer to FIG. 8) and a shearing edge formed of an edge portion of the second through-hole 67 of the second plate 32 has an arc shape (refer to FIG. 9).

At the time of the second collision, when the pin 61 is broken, the movable bracket 24 is released from the fixed bracket 23 and, as described above, departs from the initial position (refer to FIG. 6) to the front side (downstream side in the movement direction Z1) in the axial direction X1 as shown in FIG. 7. That is, at the time of the second collision, the pin 61 is broken between the first through-hole 66 and the second through-hole 67 which are shifted from each other, and thereby the movable bracket 24 can move relatively to the fixed bracket 23 in the axial direction X1. In this manner, impact from the second collision is absorbed.

In addition, at the time of the second collision, in a state in which the sliding member is interposed between the movable bracket 24 (top surface 32A of the second plate 32) and the fixed bracket 23 (under surface 30B of the first plate 30), the sliding member 89 assembled to the movable bracket 24 moves integrally with the movable bracket 24 toward the downstream side in the movement direction Z1 and, at this time, the sliding member rubs against the under surface 30B of the first plate 30 of the fixed bracket 23. Specifically, a surface (top surface 90D) of the main body section 90 of the sliding member 89 on the first plate 30 side rubs against the fixed bracket 23 through the friction-reducing material 81.

As above, in the steering device 1, at the time of the second collision, the movable bracket 24 moves relatively to the fixed bracket 23 toward the downstream side (front side) in the movement direction Z1, and thereby it is possible to absorb the impact at the time of the second collision.

Here, since the sliding member 89 moves integrally with the movable bracket 24 in the state in which the sliding member assembled to the movable bracket 24 is interposed between the top surface 32A of the movable bracket 24 and the fixed bracket 23, it is possible to reduce friction between the movable bracket 24 and the fixed bracket 23.

The main body section 90 of such a sliding member 89, which is inserted between the top surface 32A of the movable bracket 24 and the fixed bracket 23, is provided over the entire region of the top surface 32A of the movable bracket 24 in the movement direction Z1. In this manner, a distance W between the top surface 32A of the second plate 32 of the movable bracket 24 and the under surface 30B of the first plate 30 of the fixed bracket 23 is maintained in a state in which the distance is constant over the entire region in the movement direction Z1 (refer to FIG. 6). Hence, since the movable bracket 24 can be stable and can move relatively to the fixed bracket at the time of the second collision, without a rapid change of its orientation with respect to the fixed bracket 23 in the state in which the distance W is invariably constant, it is possible to achieve stabilization of the energy absorbing load at the time of the second collision (to be more exact, after the movable bracket 24 departs from the initial position).

In addition, the bent portion 91 is latched to the movable bracket 24 from the downstream side in the movement direction Z1. Accordingly, it is possible not only to position the sliding member 89 with respect to the movable bracket 24 in the movement direction Z1, but also to reliably force the sliding member 89 to move integrally with the movable bracket 24 toward the downstream side in the movement direction Z1 at the time of the second collision. Also, the main body section 90 is only mounted on (covers, from above) the top surface 32A of the movable bracket 24 such that the bent portion 91 is latched to the movable bracket 24, and thereby it is possible to easily assemble the sliding member 89 to the movable bracket 24. Further, it is possible to achieve positioning of the sliding member 89. Hence, man-hour reduction or simplification of an adjustment of an assembly position is achieved in the assembly of the sliding member 89. Hence, it is possible to achieve improvement of an assembly of the sliding member 89. Particularly, the bent portion 91 is latched to the movable bracket 24, and thereby operators can assemble the sliding member 89 without mistaking the front and back thereof (vertical orientation) such that the top surface 90D of the main body section 90, on which the friction-reducing material 81 is provided, faces the upper side.

As above, in the steering device 1, it is possible to achieve compatibility of both improvement of an assembly of a configuration (sliding member 89), in which friction between a pair of relatively moving members (between the movable bracket 24 and the fixed bracket 23) is reduced such that impact energy due to the second collision is absorbed, and stabilization of energy-absorbing load at the time of the second collision in the case of using the configuration.

Particularly, the sliding member 89 has a one-piece structure described above. For example, in a sliding member having a two-piece structure, in which it is possible to perform separation into two components such as a front-side portion and a rear-side portion, it is conceivable to employ a configuration in which the front-side portion and the rear-side portion are assembled to the movable bracket 24, respectively. Alternatively, it is conceivable to employ a configuration in which the front-side portion is assembled to the movable bracket 24, and then the rear-side portion is assembled to the fixed bracket 23. Compared to these configurations, since the sliding member 89 of the one-piece structure is assembled only by mounting on the movable bracket 24, it is possible to significantly improve the assembly. In addition, in a case of a configuration in which the front-side portion is assembled to the movable bracket 24 and then the rear-side portion is assembled to the fixed bracket 23, when the rear-side portion is detached from the movable bracket 24 (between the fixed bracket 23 and the movable bracket 24) along with the department of the movable bracket 24 from the initial position at the time of the second collision, the movable bracket 24 rapidly changes its orientation with respect to the fixed bracket 23. Therefore, there is a concern that the energy absorbing load will be rapidly increased at that time. However, according to the sliding member 89 of the present embodiment, there is no such concern.

In addition, since the maximum dimension M of the main body section 90 in the right-left direction Y1 is greater than the maximum distance N between the pair of side plates 41 of the movable bracket 24 (refer to FIG. 4), it is not possible to physically embed the sliding member 89 between the pair of side plates 41 by mistake without inclining the orientation of the sliding member 89. Accordingly, it is possible to correctly assemble the sliding member 89 to the movable bracket 24 such that the main body section 90 is mounted on the top surface 32A of the second plate 32 of the movable bracket 24. Hence, it is possible to achieve the improvement of the assembly of the sliding member 89.

In addition, the second plate 32 of the movable bracket 24 is interposed between the holding portion 95 formed on the distal end portion of the bent portion 91 and the main body section 90, and thereby it is possible to reliably latch the bent portion 91 to the movable bracket 24.

In addition, the distance K between one edge 95A and the other edge 95B of the holding portion 95 in the right-left direction Y1 is equal to the distance L between the pair of side plates 41 on boundaries between the pair of side plates 41 and the second plate 32 (refer to FIG. 4). The distance K means a distance between the outer-side edges of the pair of holding portions 95 positioned at both ends in the right-left direction Y1 in a case where the pair of holding portions 95 are arranged in the right-left direction Y1. Accordingly, when the holding portions 95 are arranged between the pair of side plates 41 of the movable bracket 24, it is possible to position the sliding member 89 with respect to the movable bracket 24 in the right-left direction Y1, and then there is no need of a minute adjustment (of the position in the right-left direction Y1) of the sliding member 89. Hence, simplification of the adjustment of the assembly position in the right-left direction Y1 enables the improvement of the assembly of the sliding member 89 to be achieved.

Also, the suspending member 25 passes through the cutout portion 93 of the sliding member 89, and thereby it is possible to assemble the sliding member 89 to the movable bracket 24 without interference with the suspending member 25 (disposition region of the suspending member 25) (refer to FIG. 2 and FIG. 3).

The invention is not limited to the embodiments described above and various modifications thereof can be performed within the scope of the claims.

For example, the size (particularly, the dimension in the right-left direction Y1) or the number of the bent portions 91 can be arbitrarily modified within a range in which the distance K (refer to FIG. 4) described above is satisfied.

Figure 10:
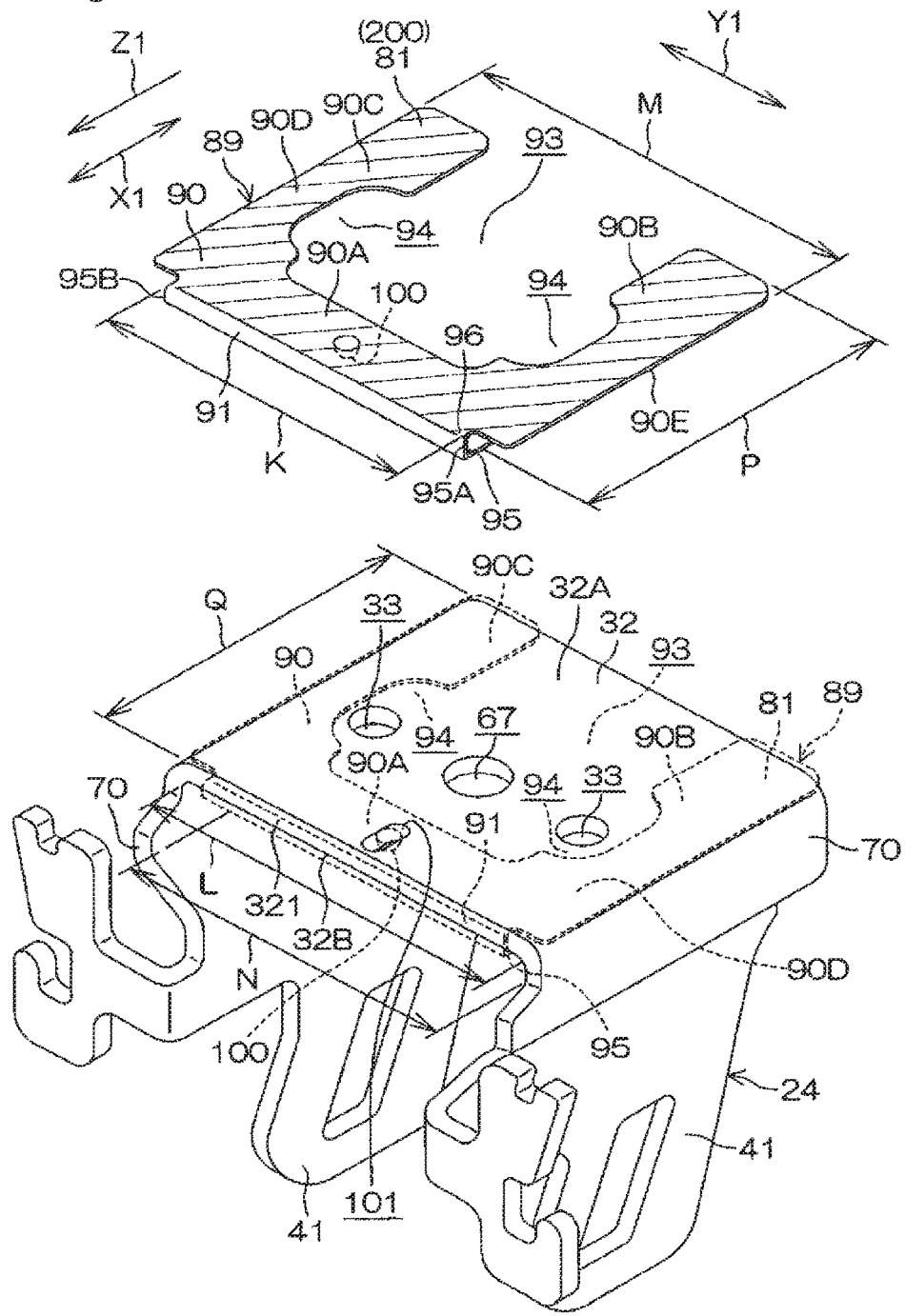
FIG. 10 is a view showing application of a modification example to the embodiment in FIG. 4.

In addition, the two right and left bent portions 91 in FIG. 4 may be connected and one bent portion 91 may be formed as shown in FIG. 10. In FIG. 10, the same reference sign is assigned to the same member as the member described above and description thereof is omitted. In a case shown in FIG. 10, the distance K described above means a width of the bent portion 91 (holding portion 95) and is set to be smaller than the distance K in FIG. 4. In this manner, since the holding portion 95 is disposed to play between the pair of side plates 41 of the movable bracket 24, little contribution of the holding portion is provided for the positioning of the sliding member 89 and the movable bracket 24 in the right-left direction Y1. Therefore, a convex portion 100 protruding downward is formed on the under surface 90E of the main body section 90 (for example, substantially the center of the front end portion 90A in the right-left direction Y1) of the sliding member 89. When a predetermined portion of the top surface 90D of the main body section 90, on which the convex portion 100 is formed, is recessed downward through an embossing process or the like, a position matching the position on the under surface 90E is raised to have a substantially concave hemispherical shape. The substantially hemispherical portion is the convex portion 100. In addition, a concave portion 101 recessed downward is provided on the top surface 32A of the second plate 32 of the movable bracket 24, on which the sliding member 89 is set (mounted). The concave portion 101 is a long hole elongating in the axial direction X1 and is provided substantially at the center of the front end portion 321 of the second plate 32 in the right-left direction Y1. The concave portion 101 may penetrate through the second plate 32 in the plate-thickness direction or may not penetrate through the second plate. When the sliding member 89 is set on the movable bracket 24, the convex portion 100 of the sliding member 89 is fitted in the concave portion 101 of the movable bracket 24. In this manner, the sliding member 89 and the movable bracket 24 are positioned from each other in the right-left direction Y1. Further, the convex portion 100 may be provided on the movable bracket 24 and the concave portion 101 may be provided on the sliding member 89. In short, the convex portion 100 may be provided on one of the sliding member 89 or the movable bracket 24 and the concave portion 101, in which the convex portion 100 is fitted, may be provided on the other. In addition, the number, size, and shape of the convex portions 100 and the concave portions 101 can be arbitrarily modified. The convex portion 100 and the concave portion 101 are not limited to the modification example in FIG. 10 and can also be applied to the embodiment (FIG. 4 or the like) described above.

In addition, the size and the shape of the cutout portion 93 of the sliding member 89 can arbitrarily be modified. In short, at the time of the second collision, the cutout portion 93 may be configured such that the peripheral edge portion of the sliding member 89 is not latched to a component (for example, a broken piece 61A of the pin 61, which remains in the first through-hole 66 of the fixed bracket 23 as shown in FIG. 7) on the fixed bracket 23 side, through the cutout portion 93.

In addition, in the embodiments described above, the dimension P of the main body section 90 of the sliding member 89 in the axial direction X1 is equal to or greater than the dimension Q of the top surface 32A of the second plate 32 in the axial direction X1, and thereby the main body section 90 is provided on the entire region of the top surface 32A of the movable bracket 24 in the movement direction Z1 (refer to FIG. 4). However, when the distance W (refer to FIG. 6 and FIG. 7) between the top surface 32A of the movable bracket 24 and the fixed bracket 23 is invariably maintained to be constant over the entire region in the movement direction Z1, the dimension P may be slightly smaller than the dimension Q. In this case, the main body section 90 may be provided over the entire region of the top surface 32A of the movable bracket 24 in the movement direction Z1.

In addition, the main body section 90 of the sliding member 89 of the embodiments described above when viewed in the plate-thickness direction has the U shape opened toward the rear side (refer to FIG. 4); however, the main body section may have an H shape. In the case of the H shape, a horizontal line portion in the H shape is configured of the front end portion 90A of the main body section 90 and two vertical line portions is configured of the left end portion 90B and the right end portion 90C of the main body section 90.

In addition, instead of the friction-reducing material 81 described above, a friction-reducing material (hereinafter, conductive friction-reducing material) 200 having conductivity may be provided on at least the portion of the sliding member 89, which rubs against the fixed bracket 23. The portion of the sliding member 89, which rubs against the fixed bracket 23, is the entire region of the top surface 90D (also, including the top surface of the portion of the bent portion 91, which extends out from the main body section 90 to the front side) of the main body section 90 and is the region hatched in FIG. 4 and FIG. 10. As an example of the conductive friction-reducing material 200, a conductive type of resin coating metal which is referred to as Techmet® by Oiles Corporation, or other conductive resins can be used. It is preferable that the entire region of the portion of the sliding member 89, which rubs against the fixed bracket 23, is coated with the conductive friction-reducing material 200.

The sliding member 89, on which the conductive friction-reducing material 200 is provided, enables conductivity between the fixed bracket 23 and the movable bracket 24 to be secured. For example, a switch of an electric component such as a horn may be provided in the steering member 2 (refer to FIG. 1). When conductivity can be secured between the fixed bracket 23 and the movable bracket 24, the switch can be grounded through the fixed bracket 23, the movable bracket 24, and the vehicle body (vehicle body-side member 13). Further, in order to reliably secure conductivity between the fixed bracket 23 and the movable bracket 24, the conductive friction-reducing material 200 may also be provided on the portion of the sliding member 89, which comes into contact with the movable bracket 24 or the entire sliding member 89 may be formed of the conductive friction-reducing material 200.

In addition, even in the case of using the conductive friction-reducing material 200, similar to the case where the friction-reducing material 81 is provided, it is possible to achieve a smooth movement of the movable bracket 24 relatively to the fixed bracket 23 at the time of the second collision.

INDUSTRIAL APPLICABILITY

According to the present invention, it is possible to provide a steering device in which it is possible to achieve compatibility of both improvement of an assembly of a configuration, in which friction between a pair of relatively moving members is reduced such that impact energy due to the second collision is absorbed, and stabilization of energy-absorbing load at the time of the second collision in a case of using the configuration.

REFERENCE SIGNS LIST

1 . . . steering device
2 . . . steering member
13 . . . vehicle body-side member
23 . . . fixed bracket
24 . . . movable bracket
25 . . . suspending member
32 . . . second plate
32A . . . top surface
41 . . . side plate
89 . . . sliding member
90 . . . main body section
90A . . . front end portion
91 . . . bent portion (stopping portion)
93 . . . cutout portion
95 . . . holding portion
95A . . . one edge
95B . . . the other edge
100 . . . convex portion
101 . . . concave portion
200 . . . conductive friction-reducing material
K . . . distance
L . . . distance
M . . . maximum dimension
N . . . maximum distance
Y1 . . . right-left direction
Z1 . . . movement direction

The invention claimed is:

1. A steering device comprising:
a fixed bracket fixed to a vehicle body;
a movable bracket having a facing surface which faces the fixed bracket, the movable bracket being connected to a steering member, the movable bracket being configured to move relative to the fixed bracket along with the steering member toward a downstream side in a predetermined movement direction at a time of a second collision; and
a sliding member assembled to the movable bracket, the sliding member being configured to move integrally with the movable bracket in a state of being interposed between the facing surface and the fixed bracket at the time of the second collision, the sliding member including:
a main body section provided over an entire area of the facing surface in the movement direction, the main body section being located between and in direct contact with the facing surface and the fixed bracket, the main body section being configured to rub against the fixed bracket at the time of the second collision during movement between the facing surface of the movable bracket and the fixed bracket, the main body section including a cutout portion that is open towards an upstream side in the movement direction, a connection member being provided in the cutout portion, the connection member positioning the movable bracket with respect to the fixed bracket, and the connection member is sheared to allow the movable bracket to be released from the fixed bracket at the time of the second collision; and
an attaching section bent from a downstream-side end portion of the main body section in the movement direction, the attaching section being latched to the movable bracket from the downstream side in the movement direction.

2. The steering device according to claim 1, wherein:
the movable bracket includes a plate-like section which includes the facing surface and a pair of curved sections which are curved in the same direction from both sides of the plate-like section in an orthogonal direction to the movement direction, and
a maximum dimension of the main body section in the orthogonal direction is greater than a maximum distance between the pair of curved sections.

3. The steering device according to claim 2, wherein the attaching section includes a holding portion which is formed by bending a distal end portion of the attaching section on a side opposite to the main body section side toward an upstream side in the movement direction, and which is disposed between the pair of curved sections so as to hold the plate-like section between the main body section and the holding portion.

4. The steering device according to claim 3, wherein a distance from one edge to another edge of the holding portion in the orthogonal direction is equal to a distance of the pair of curved sections on boundaries between the pair of curved sections and the plate-like section.

5. The steering device according to claim 1, wherein
a convex portion is provided on one of the sliding member and the movable bracket, and
a concave portion, in which the convex portion is fitted, is provided on the other of the sliding member and the movable bracket.

6. The steering device according to claim 1, further comprising:
a suspending member extending from the fixed bracket and suspending the movable bracket,
wherein the cutout portion, through which the suspending member passes, is formed in the sliding member.

7. The steering device according to claim 1, wherein a conductive friction-reducing material is provided on a portion of the sliding member, which rubs against the fixed bracket.

8. The steering device according to claim 1, wherein:
the main body section extends along an entire length of the facing surface of the movable bracket in the movement direction at both peripheral side edges of the facing surface in the movement direction and a downstream peripheral edge of the facing surface in a direction perpendicular to the movement direction; and
the main body section is configured to contact and cause friction with the fixed bracket at the time of the second collision.

9. A steering device comprising:
a fixed bracket fixed to a vehicle body;
a movable bracket having a facing surface which faces the fixed bracket, the movable bracket being connected to a steering member, the movable bracket being configured to move relative to the fixed bracket along with the steering member toward a downstream side in a predetermined movement direction at a time of a second collision; and
a sliding member assembled to the movable bracket, the sliding member being configured to move integrally with the movable bracket in a state of being interposed between the facing surface and the fixed bracket at the time of the second collision, the sliding member including:
a main body section provided over a U-shaped area of the facing surface such that the main body section entirely only covers a downstream end of the facing surface in the movement direction and both sides of the facing surface that extend in the movement direction, the main body section being located between and in direct contact with the facing surface and the fixed bracket, the main body section being configured to rub against the fixed bracket at the time of the second collision during movement between the facing surface of the movable bracket and the fixed bracket; and
an attaching section bent from a downstream-side end portion of the main body section in the movement direction, the attaching section being latched to the movable bracket from the downstream side in the movement direction.

10. The steering device according to claim 9, wherein:
the movable bracket includes a plate-like section which includes the facing surface and a pair of curved sections which are curved in the same direction from both sides of the plate-like section in an orthogonal direction to the movement direction, and
a maximum dimension of the main body section in the orthogonal direction is greater than a maximum distance between the pair of curved sections.

11. The steering device according to claim 10, wherein the attaching section includes a holding portion which is formed by bending a distal end portion of the attaching section on a side opposite to the main body section side toward an upstream side in the movement direction, and which is disposed between the pair of curved sections so as to hold the plate-like section between the main body section and the holding portion.

12. The steering device according to claim 11, wherein a distance from one edge to another edge of the holding portion in the orthogonal direction is equal to a distance of the pair of curved sections on boundaries between the pair of curved sections and the plate-like section.

13. The steering device according to claim 9, wherein
a convex portion is provided on one of the sliding member and the movable bracket, and
a concave portion, in which the convex portion is fitted, is provided on the other of the sliding member and the movable bracket.

14. The steering device according to claim 9, further comprising:
a suspending member extending from the fixed bracket and suspending the movable bracket,
wherein a cutout portion, through which the suspending member passes, is formed in the sliding member.

15. The steering device according to claim 9, wherein a conductive friction-reducing material is provided on a portion of the sliding member, which rubs against the fixed bracket.

16. The steering device according to claim 9, wherein:
the main body section extends along an entire length of the facing surface of the movable bracket in the movement direction at both peripheral side edges of the facing surface in the movement direction and a downstream peripheral edge of the facing surface in a direction perpendicular to the movement direction; and
the main body section is configured to contact and cause friction with the fixed bracket at the time of the second collision.

17. The steering device according to claim 9, wherein:
the main body section includes a cutout portion that is open towards an upstream side in the movement direction; and
a connection member is provided in the cutout portion, the connection member positioning the movable bracket with respect to the fixed bracket, and the connection member is sheared to allow the movable bracket to be released from the fixed bracket at the time of the second collision.

* * * * *